9622X
F. A. Fickhardt.
Heating Stove.
Patented Apr. 28, 1836.
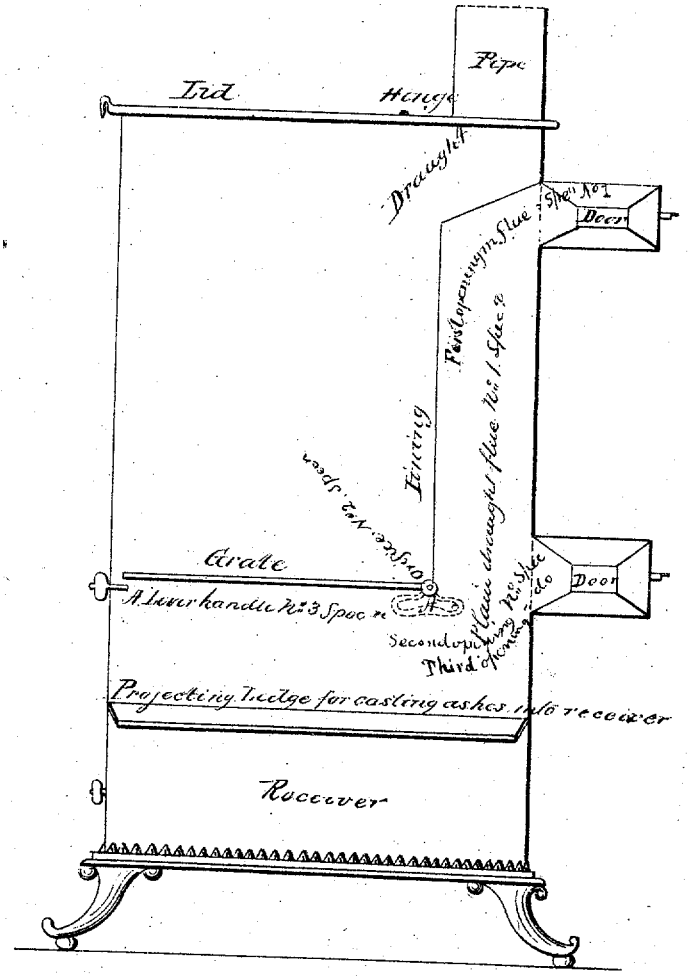
Pipe
Lid
Hinge
Draught
Spoon No 1
Door
First opening in flue
Firing
First flue No. 1
Second flue No. 2
Grate
A Lever handle No. 3 Spoon
Door
Second opening
Third opening
Projecting Ledge for casting ashes into receiver
Receiver 96[illegible]x Apr. 28, 1836

Frederick A. Fickhardt. Easton P.a

Letters Patent.

The Schedule referred to in these Letters Patent and making
part of the same, containing a description in the words of the
said Frederick A. Fickardt himself, of his improvement
in coal stoves.

To all to whom these presents shall come.
Be it known that I Frederick A. Fickardt of the Borough
of Easton, in the County of Northampton and State of Pennsyl=
vania, have invented certain new and useful improvements
in coal stoves, that is the ordinary coal stoves; and that the
following is a full and exact description thereof, to wit:
1st A plain draught flue extending itself over the outer sur-
face of the stove or cylinder (as the case may be, and in the draft
and model accompanying this specification made to extend
itself upwards over the hinder face of the stove,) having an opening
at the end, the upper extremity of the flue, communicating with the
apartment to be heated, for the purpose of admitting the draught
into the flue; and another at the opposite extremity communicating with
a chamber beneath the grate, for the purpose of giving the draught
and also a third opening on a level or nearly on a level with the grate,
also communicating with the apartment, for the purpose of giving
access to an orifice in the stove or cylinder, presently hereinafter
to be described; The first and third openings having doors or slides
wherewith they may be opened or closed at pleasure. 2nd an orifice
i.e. one or more in the body of the stove or cylinder above the grate
and within the "flue" above described in No. 1. for the introduction
of a poker for the purpose of stirring the fire. 3rd A "Lever Handle" attach-
ed, on the outside of the stove, to a cross bar of the grate for the purpose
of raising the grate when down; said cross bar being the axis of swing
and

9622X

Apr 28, 1836 and dependency to the grate.- What I claim as my own inven-
tion and not previously known of the above described parts
is in the first place the "Main draught flue" as described in art. 1. of
the above specifications; and in the second place, the "orifice
above the grate" as described in art. 2. of the above specifications
and in the third place, the "Lever Handle on the outside of the stove",
as described in art. 3. of the above specifications. 4th A projecting
Ledge for directing ashes falling at sides into the receiver.
1st The design and use of the "flue" as above described, is to
furnish a full draught of hot air, unimpaired in its combustible
qualities, as far, as perhaps is practicable, and at the same
time to promote a circulation and change of air within the
apartment, by taking its supply of air therefrom, and as well
also, to receive any fire, ashes, smoke, dust &c. which may
escape out of the orifice described in art. 2. as above, in stirring
the fire and otherwise. 2. The design and use of the orifice as
above described, is to permit an easier and more effective use of
the poker; and to give the person operating on the contents of the stove
or cylinder, a fulcrum for the exercise of his power. The orifice
is placed within the flue, in order to prevent any danger from
the escape of fire from it or any inconvenience from such ashes,
dust, or smoke as may find exit through the same. 3rd The
design and use of the Lever Handle as described in art. 3 as above
is to enable the person attending to the stove to raise the fallen
grate from without, thereby avoiding the disagreeable necessity
of introducing the hand beneath it in order to elevate it to its
ultimate position. 4th. The design of the Ledge to cast ashes &c. into
the receiver.

Frederick A. Fickardt

Witnesses
Nath! Gerhard
D. Sackmour

Drawings

[728 Words